March 4, 1941.  G. NARTEN  2,233,675

DEVICE FOR HEATING LIQUIDS

Filed Sept. 14, 1937

Inventor:
Georg Narten
BY Mock & Blum
Attorneys

UNITED STATES PATENT OFFICE 2,233,675

DEVICE FOR HEATING LIQUIDS

Georg Narten, Ida- und Marienhuette, near Saarau, Germany, assignor to the firm Silesia Verein Chemischer Fabriken, Saarau, Kreis Schweidnitz, Germany Application September 14, 1937, Serial No. 163,795
In Germany November 2, 1936

2 Claims. (Cl. 60—45)

This invention relates to an improved process and a device for heating and evaporating liquids.

According to my invention the heating and evaporation of water or other liquids is effected by utilizing the so-called flameless combustion thereby burning the combustible gases in a porous plate without flame under water or the like. A mixture of air and combustible gas is conducted under the surface of the liquid through a porous layer of incandescent fire-proof substance, complete combustion being secured without the formation of flames. The gases of combustion escape through the liquid, the heat of combustion effectively heating or evaporating the liquid. In carrying out my invention the gases burn quietly and evenly in the interior of the liquid to be heated. Almost the whole of the calorific value of the fuel can thus be transferred to the liquid and the corrosion of the evaporating pans or the like is avoided. It is advantageous to finely distribute the gases of combustion in the interior of the liquid to be heated, thus facilitating the transfer of the heat to the liquid.

Figure 1:
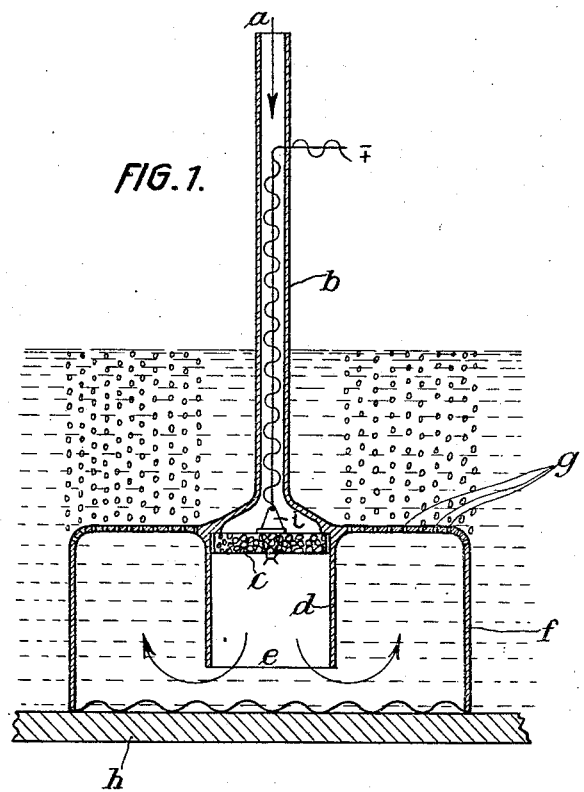
Figure 2:
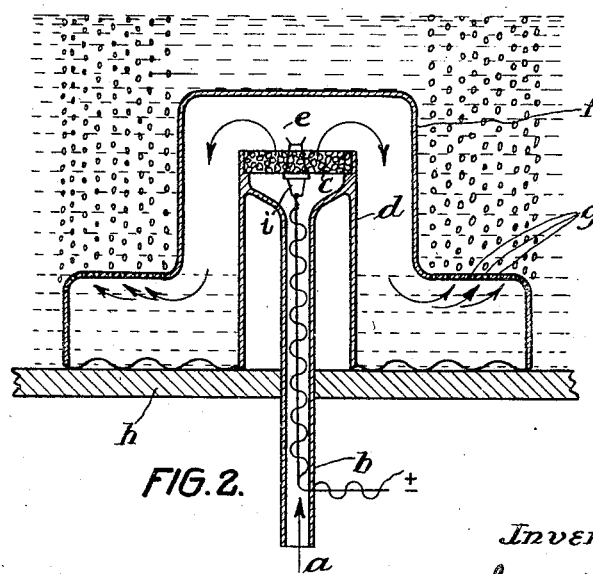

The invention will now be described by way of example with reference to the accompanying drawing in which:

Figure 1 is a section through a burner constructed in accordance with one embodiment of the invention and Figure 2 is a section through a construction according to a further embodiment of the invention.

In the drawing like reference letters refer to like parts.

Referring to Figure 1, a mixture of air and combustible gas is introduced to the burner at $a$ under the necessary pressure to overcome the resistance of the burner and of the liquid. This pressure is, for instance, equivalent to that of a 5 meter water column. The production of the combustible gas mixture preferably takes place in known manner outside the actual burner, for example by means of an injector not shown in the drawing. 100 parts by volume of generator gas and 150 parts by volume of air are mixed, the mixture being supplied under an absolute pressure of about 1.5 atmospheres to the pipe $a$. The combustible gas mixture, when supplied to the burner, may be at ordinary room temperature (18–20° C.) or a preheated gas mixture at a temperature of about 100° C. may be used. Instead of generator gas other gas, for example water gas, coal gas or vapours of benzine may be used, their mixing with air being effected by means of an injector. It is preferable to use a slight excess of air over the exact quantity required in theory. A greater excess of air, however, may be used. The combustible gas passes through the tube $b$ to a porous plate $c$ which consists of a ceramic refractory or other suitable material. The plate $c$ is located within the burner housing $d$ which may consist of glass, quartz, lead, or other material. The gas is ignited preferably at the burner-mouth $e$. Ignition can either take place electrically when the burner is immersed in the liquid or by means of a flame before immersion. The electric ignition may be effected by means of sparking plugs $i$ in a similar manner as in internal combustion engines. The flameless combustion takes place within the porous plate $c$ and causes it to glow.

In order to cause a steady stream of burnt gas in the liquid, the burner is provided with a cup $f$, of, for example, three times the surface area of the mouth $e$ of the burner. This cup may consist of glass, quartz, lead or other material. The upper surface of this cup is perforated with a large number of fine holes $g$ so that it acts as a fine sieve distributing the gas in the liquid. Thus an even flow of the gases and an efficeint heat transfer may be attained. If the burner is placed in the liquid on the bottom $h$ of the container, then the burner will burn on quietly and give up the heat produced to the liquid.

Figure 2 shows likewise in section a further embodiment of the burner according to my invention. The mixture of the combustible gas and air is introduced through the bottom $h$ of the container. The reference letters refer to like parts in Figure 1 and the burner has been merely inverted which in my case has proven practical. The ignition of the gas takes place either electrically beneath the liquid or by means of a flame in the empty container after removal of the distribution cup $f$. The cup is replaced over the burner after regulation of the combustion and the liquid to be evaporated is poured into the container.

In consequence of the simplicity of the construction of the burner described it may be made from acid or alkali resistant material, for instance from quartz, glass, hard lead or other material. Thus it is possible to use this burner with particular advantage for heating and evaporating strongly corrosive liquids, for instance acids. There is no longer any difficulty in constructing and lining containers for such strongly corrosive liquids having regard to the state of the art at the present time. However, in the case of such containers the usual direct or indirect methods of heating, such as steam, oil, gas or coal firing cannot be used since the usual chemically resisting materials are sensitive to heat stresses and since the containers made therefrom cannot be heated from the exterior on account of their low heat conductivity. In all these cases, for instance in heating or evaporating sulphuric acid or phosphoric acid the use of my present invention is particularly advantageous.

I wish it to be understood that I do not desire to be limited to the exact details of construction shown and described or proportions herein set forth, for obvious modifications will occur to a person skilled in the art.

What I claim is:

1. An immersion device for heating a liquid, comprising a cylindrical burner which contains a porous burner plate of refractory material, a tube for introducing a combustible mixture into said porous burner plate, said tube being connected with said burner, means for igniting said combustible mixture, and a cup surrounding said burner and immersed in the liquid, said cup comprising a horizontal annular section, said annular section of said cup being provided with perforations through which the burnt gas escapes from said cup into the surrounding liquid.

2. An immersion device for heating a liquid, comprising a cylindrical burner which contains a porous burner plate of refractory material, a tube for introducing a combustible mixture into said porous plate through the bottom of the container holding the liquid to be heated, said tube being connected with said burner, means for igniting said combustible mixture, and a cup surrounding said burner and immersed in said liquid, said cup comprising two cylindrical sections, and a horizontal annular section, said horizontal annular section being provided with perforations permitting the escape of burnt gases into the surrounding liquid.

GEORG NARTEN.